(12) United States Patent
Botros et al.

(10) Patent No.: US 7,932,323 B1
(45) Date of Patent: Apr. 26, 2011

(54) POLYOLEFIN-BASED ADHESIVES HAVING IMPROVED OXIDATIVE STABILITY

(75) Inventors: Maged G. Botros, West Chester, OH (US); Robert L. Sherman, Jr., Blue Ash, OH (US); Charles S. Holland, Springboro, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 12/590,224

(22) Filed: Nov. 4, 2009

(51) Int. Cl.
*C08F 230/02* (2006.01)
(52) U.S. Cl. .......... 525/255; 525/221; 525/240; 525/78
(58) Field of Classification Search .................. 525/221, 525/240, 78, 255
See application file for complete search history.

(56) References Cited

U.S. PATENT DOCUMENTS

| | | | | |
|---|---|---|---|---|
| 4,223,115 A | * | 9/1980 | Zalucha et al. | 525/455 |
| 4,487,885 A | * | 12/1984 | Adur et al. | 525/74 |
| 6,306,996 B1 | | 10/2001 | Cecchin et al. | |
| 6,716,928 B2 | | 4/2004 | Botros | |
| 7,223,432 B2 | | 5/2007 | Cholli et al. | |
| 2009/0203847 A1 | * | 8/2009 | Ellis et al. | 525/221 |

FOREIGN PATENT DOCUMENTS

| WO | WO 91/18934 | 12/1991 |
|---|---|---|
| WO | WO 2007/003530 | 1/2007 |
| WO | WO 2007/149274 | 12/2007 |

* cited by examiner

*Primary Examiner* — Ling-Siu Choi
(74) *Attorney, Agent, or Firm* — Shao-Hua Guo

(57) ABSTRACT

Disclosed is an adhesive composition. The adhesive composition comprises a polyolefin, a maleated polyolefin, a Bronsted acid, and an antioxidant. The adhesive composition has improved oxidative stability compared with those which do not contain Bronsted acids.

14 Claims, No Drawings

POLYOLEFIN-BASED ADHESIVES HAVING IMPROVED OXIDATIVE STABILITY

FIELD OF THE INVENTION

The present invention relates to adhesives. More particularly, the invention relates to adhesives that have improved oxidative stability.

BACKGROUND OF THE INVENTION

Polyolefin-based adhesives are useful for bonding polyolefins with polar materials such as nylon, ethylene vinyl alcohol copolymer (EVOH), and metals. Polyolefin-based adhesives commonly comprise maleic anhydride-grafted polyolefins. The grafting is usually performed by visbreaking, with or without free radical initiator, the polyolefin in the presence of maleic anhydride to cause formation of free radicals on the polymer chains that react with maleic anhydride. The grafted polyolefin is typically let-down with additional polyolefin resins to a desired concentration and to provide a polyolefin-based adhesive. See U.S. Pat. No. 4,487,885. The grafted polyolefin can be let-down by a variety of polyolefin resins, including high density polyethylene (HDPE), low density polyethylene (LDPE), linear low density polyethylene (LLDPE), polypropylene, and ethylene-vinyl acetate copolymers. High performance adhesives also utilize a polyolefin elastomer as a modifier.

One application of polyolefin-based adhesives is for polymer-metal multilayer pipes. The multilayer pipes are increasingly used for plumbing and heating applications. PE (polyethylene) and PEX (cross-linked PE) are commonly used polyolefins; aluminum and copper are commonly used metals. The multilayer pipes usually have the structure of PEX/tie/metal/tie/PEX or PE/tie/metal/tie/PE. Although the metal provides most of the mechanical strength in these constructions, mechanical integrity and pressure ratings of the multilayer pipes depend on the quality of the tie layer between the metal and PE. There is a need for polyolefin-based adhesives that have improved oxidative stability.

SUMMARY OF THE INVENTION

The invention is an adhesive composition. The adhesive composition comprises a polyolefin, a maleated polyolefin, a Bronsted acid, and an antioxidant. The adhesive composition has improved oxidative stability compared with those which do not contain Bronsted acids.

DETAILED DESCRIPTION OF THE INVENTION

The adhesive composition of the invention comprises a polyolefin, a maleated polyolefin, a Bronsted acid, and an antioxidant. Suitable polyolefins for use in the adhesive composition of the invention include those made from one or more $C_2$-$C_{10}$ α-olefin monomers. Preferably, the polyolefin is selected from the group consisting of polyethylene, polypropylene, polybutene, the like, and mixtures thereof. Suitable polyethylene includes ethylene homopolymers, copolymers of ethylene with at least one $C_3$ to $C_{10}$ α-olefin, the like, and mixtures thereof. They include high-density polyethylene (HDPE, density 0.941 g/cm³ or greater), low-density polyethylene (LDPE, density 0.910 g/cm³ to 0.925 g/cm³), medium-density polyethylene (MDPE, density 0.926 g/cm³ to 0.940 g/cm³), and linear low-density polyethylene (LLDPE, density 0.910 g/cm³ to 0.925 g/cm³), ultra-low density polyethylene or polyethylene plastomers (density less than 0.910 g/cm³), the like, and mixtures thereof. Suitable polyethylene has a melt index ($MI_2$) (as determined by ASTM D-1238-01 at a temperature of 190° C. and at a load of 2.16 kg) preferably within the range of 0.01 dg/min to 150 dg/min, more preferably within the range of 0.01 dg/min to 10 dg/min, and most preferably within the range of 0.01 dg/min to 5 dg/min.

Suitable polypropylene includes amorphous polypropylene, semi-crystalline polypropylene, the like, and mixtures thereof. Preferably, the semi-crystalline polypropylene is selected from the group consisting of propylene homopolymers, copolymers of propylene with at least one other $C_2$ to $C_{10}$ α-olefin, the like, and mixtures thereof. Copolymers of propylene include random copolymers and impact copolymers. Preferred α-olefins for such copolymers include ethylene, 1-butene, 1-pentene, 1-hexene, methyl-1-butenes, methyl-1-pentenes, 1-octene, 1-decene, the like, and mixtures thereof. "Semi-crystalline," as used herein, means that the crystallinity is greater than or equal to 40%, preferably greater than or equal to 55%, and more preferably greater than or equal to 80%. Preferably, the semi-crystalline polypropylene has a melt flow rate (as determined by ASTM D-1238-01 at a temperature of 230° C. and at a load of 2.16 kg) within the range of 0.001 dg/min to 500 dg/min. Preferably, the semi-crystalline polypropylene has a density within the range of 0.897 g/cm³ to 0.925 g/cm³ and a weight average molecular weight (Mw) within the range of 85,000 to 900,000.

Suitable polybutene includes homopolymers of butene-1, copolymers of butene-1 with at least one other $C_2$ to $C_{10}$ α-olefin, the like, and mixtures thereof. Preferred α-olefins for such copolymers include ethylene, propylene, 1-pentene, 1-hexene, methyl-1-butenes, methyl-1-pentenes, 1-octene, 1-decene, the like, and mixtures thereof. The polybutene has a melt index (as determined by ASTM D-1238, Condition E) preferably within the range of 0.01 dg/min to 1000 dg/min, more preferably within the range of 0.1 dg/min to 750 dg/min. Methods for producing polybutene are known. For instance, see U.S. Pat. No. 6,306,996, the teachings of which are herein incorporated by reference.

Polyethylene is a preferred polyolefin for use in the adhesive composition of the invention. LLDPE is more preferred. Suitable LLDPE includes copolymers of ethylene and one or more $C_3$ to $C_{10}$ α-olefins. Suitable α-olefins include 1-butene, 1-hexene, and 1-octene, the like, and mixtures thereof. The density of LLDPE is preferably within the range of 0.865 to 0.925 g/cm³. LLDPE is commercially available, for instance GA502®, GA602® and GA616® LLDPE from Equistar Chemicals, LP. Suitable LLDPE can be produced by Ziegler-Natta, single-site, or any other olefin polymerization catalysts.

Suitable maleated polyolefin for use in the invention include maleated HDPE, LDPE, LLDPE, propylene homopolymers, propylene random copolymers, propylene impact copolymers, the like, and mixtures thereof. Methods for maleating polyolefin are known. For instance, U.S. Pat. No. 6,716,928, the teachings of which are incorporated herein by reference, teaches maleating a propylene impact copolymer. Preferably, the maleated polyolefin is a maleated HDPE. Suitable HDPE for making maleated HDPE includes ethylene homopolymers and copolymers of ethylene and one or more $C_3$ to $C_{10}$ α-olefins. Suitable α-olefins include 1-butene, 1-hexene, and 1-octene, the like, and mixtures thereof. Preferably, the HDPE comprises less than 5 wt % of the $C_3$ to $C_{10}$ α-olefins. The density of HDPE is preferably within the range of 0.932 g/cm³ to 0.965 g/cm³ and more preferably within the range 0.952 g/cm³ to 0.965 g/cm³. The maleated polyolefin preferably contains from 0.1 wt % to 10 wt %, 0.5 wt % to 5 wt %, and most preferably from 1 wt % to 2.5 wt %, of grafted maleic anhydride. The maleated polyolefin is present in the adhesive composition in an amount preferably within the range of 5 wt % to 35 wt %, more preferably within the range of 5 wt % to 25 wt %, and most preferably within the range of 8 wt % to 15 wt %, of the composition.

Suitable antioxidants include primary and secondary antioxidants known to the polyolefin industry. Suitable primary antioxidants include hindered phenols and secondary aromatic amines. These primary antioxidants terminate free radicals by transferring hydrogen from the OH or NH groups to the free radical. The resulting phenoxy and amino radicals are stable and thus do not abstract hydrogen from the polyolefin. Secondary antioxidants decompose hydroperoxides into non-radical, thermally stable products. Suitable secondary antioxidants include phosphite and thio compounds. Preferably, the antioxidant is a combination of primary and secondary antioxidants. Preferably, the primary antioxidant is a phenolic antioxidant. An example of suitable phenolic antioxidants is pentaerythrityl tetrakis(3-(3,5-di-tert-butyl-4-hydroxyphenol)propionate), which is commercially available from Ciba Inc. under the name of IRGANOX®1010. Suitable amounts of antioxidants in the adhesive composition of the invention are preferably within the range of 0.005 wt % to 5 wt %, more preferably within the range of 0.01 wt % to 1 wt %, and most preferably within the range of 0.05 wt % to 0.5 wt %, of the adhesive composition.

Suitable Bronsted acids include organic and inorganic Bronsted acids. Examples of suitable Bronsted acids include phosphoric acid, phosphorous acid, polyphosphoric acid, stearic acid, benzoic acid, lactic acid, p-toluenesulfonic acid, the like, and mixtures thereof. Preferably, the Bronsted acids have a boiling point greater than the melting point of the polyolefin, and thus the acids do not evaporate during the thermal processing of the adhesive composition. Preferably, the Bronsted acid does not decompose during the thermal processing of the adhesive composition. Preferably, the Bronsted acid is present in an amount sufficient to increase the OIT (oxidative induction time) of the adhesive composition of the invention by at least 50% compared to a corresponding composition which does not contain the Bronsted acid. More preferably, the Bronsted acid is present in an amount sufficient to increase the OIT of the adhesive composition by at least 100% compared to a corresponding composition which does not contain the Bronsted acid. Most preferably, the Bronsted acid is present in an amount sufficient to increase the OIT of the adhesive composition by at least 150% compared to a corresponding composition which does not contain the Bronsted acid. The OIT values are determined according to the procedure of ASTM D 3895. Preferably, the Bronsted acid is present in an amount within the range of 0.005 wt % to 1 wt %, more preferably within the range of 0.01 wt % to 0.5 wt %, and most preferably within the range of 0.01 wt % to 0.3 wt %, of the adhesive composition.

The adhesive composition optionally comprises an elastomer. Suitable elastomers include ethylene-propylene rubber (EPR), ethylene-propylene-diene monomer rubber (EPDM), polyisoprene, polybutadiene, styrene-diene random and block copolymers, the like, and mixtures thereof. EPR and styrene-diene block copolymers are preferred. Suitable EPR contain preferably from 10 wt % to 80 wt %, and more preferably from 10 wt % to 70 wt %, of ethylene. Suitable styrene-diene block copolymers include styrene-butadiene-styrene (SBS), styrene-isoprene-styrene (SIS), star-branched SBS and SIS, hydrogenated SBS and SIS, the like, and mixtures thereof. The elastomer is present in the adhesive composition in an amount preferably within the range of 5 wt % to 45 wt %, more preferably within the range of 5 wt % to 30 wt %, and most preferably within the range of 10 wt % to 30 wt %, of the adhesive composition.

The adhesive composition of the invention optionally comprises other additives, fillers, and modifiers. Suitable additives include foaming agents, cross-linking agents, nucleation agents, flame retardants, processing aids, antistatic agents, lubricants, optical brighteners, pigments, dispersants, water-blocking agents, UV absorbents and light stabilizers, the like, and mixtures thereof. Additives and fillers are used in an amount preferably within the range of 0.05 wt % to 15 wt %, more preferably within the range of 0.05 wt % to 5 wt %, of the adhesive composition.

The adhesive composition of the invention can be made by mixing the various components. Any suitable mixing methods known in the industry can be used. Melt blending is a preferred method. Melt mixing is preferably performed by extrusion. The various components can be mixed in any order. The Bronsted acid and the antioxidant can be dissolved in or diluted with water or organic solvents before they are mixed with the polymers.

The invention includes an article comprising the adhesive composition, including multilayer films, pipes, geomembranes, containers, automotive parts, and wire and cable insulations and jackets in which the adhesive composition is used as a tie-adhesive layer. By multilayer, we mean that the article have at least two more layers besides the tie-adhesive layer. The tie-adhesive layer bonds the other layers together. One example of multilayer film is a five-layer film which has the structure of HDPE/tie-layer/EVOH/tie-layer/HDPE. Ethylene-vinyl alcohol copolymer (EVOH) layer is employed as a barrier to oxygen. Another example of multilayer film is a seven-layer film which has the structure of LLDPE/HDPE/tie-layer/EVOH/tie-layer/HDPE/LLDPE. Suitable LLDPE and HDPE for use in the multilayer films are the same as discussed above. The articles of the invention can be made by many methods or processes. For instance, a multilayer film of the invention can be made by co-extrusion, coating, and other laminating processes.

The following examples merely illustrate the invention. Those skilled in the art will recognize many variations that are within the spirit of the invention and scope of the claims.

Example 1

LLDPE (64.65 parts by weight, GA602050, product of Equistar Chemicals, LP, copolymer of ethylene and 1-hexene, $MI_2$: 2.0 dg/min), maleated HDPE (10 parts by weight, an intermediate product of Equistar Chemicals, LP, 1.9 wt % grafted maleic anhydride), ethylene-propylene rubber (25 parts by weight, EPR V722, product of ExxonMobil Chemical), primary antioxidant (0.1 part by weight, pentaerythrityl tetrakis(3-(3,5-di-tert-butyl-4-hydroxyphenol)propionate), IRGANOX®1010, product of Ciba Inc.), primary antioxidant (0.1 part by weight, 1,3,5-trimethyl-2,4,6-tris(3,5-di-tert-butyl-4-hydroxybenzyl) benzene, IRGANOX® 1330, product of Ciba Inc.), secondary antioxidant (0.05 part by weight, tris (2,4-ditert-butylphenyl) phosphite, IRGAFOS® 168, product of Ciba Inc.), and phosphoric acid (0.1 part by weight, 85% aqueous solution, product of Fisher Scientific Company) are mixed in a Brabender mixer at 180° C. The OIT values of the composition are determined according to the procedure of ASTM D 3895. The system used to measure the OIT is TA Instruments Model 911001.902 connected to a computer running Thermal Advantage (TA) Universal Analysis 2000 (Windows 2000). The system is first calibrated with indium and tin before loading the sample and the reference pan into the cell. The samples and the reference are heated at a constant rate in an inert nitrogen environment. When the temperature reaches 200° C., the specimen is kept at 200° C. for a period of 5 minutes before changing the gas flow to oxygen. The zero point of the induction period is the point at which the nitrogen flow is switched to oxygen. The end of the induction period is signaled by an abrupt increase in the samples' evolved heat or temperature as recorded by the DSC. The measured OIT for the above composition is 155 minutes.

Example 2

The general procedure of Example 1 is followed, but 74.65 parts by weight of the LLDPE and no maleated HDPE are used. The measured OIT is 137 minutes.

Example 3

The general procedure of Example 1 is followed, but 64.55 parts by of the LLDPE and 0.2 part by weight of the phosphoric acid are used. The measured OIT is 194 minutes.

Example 4

The general procedure of Example 2 is followed, but 74.55 parts by weight of the LLDPE and 0.2 part by weight of the phosphoric acid are used. The measured OIT is 150 minutes.

Comparative Example 5

The general procedure of Example 1 is followed, but no phosphoric acid is used. The measured OIT is 81 minutes.

Comparative Example 6

The general procedure of Example 2 is followed, but no phosphoric acid is used. The measured OIT is 82 minutes.

Examples 7-9

The effect of maleated HDPE concentration on OIT is demonstrated in the adhesive compositions of Examples 7-9. The detailed compositions and the corresponding OIT values are listed in Table 1.

TABLE 1

| Ex. No. | 7 | 8 | 9 |
|---|---|---|---|
| Maleated HDPE, wt % | 1 | 3 | 5 |
| LLDPE, wt % | 73.55 | 71.55 | 69.55 |
| EPR, wt % | 25 | 25 | 25 |
| Irganox 1010, wt % | 0.1 | 0.1 | 0.1 |
| Irganox 1330, wt % | 0.1 | 0.1 | 0.1 |
| Irgafos 168, wt % | 0.05 | 0.05 | 0.05 |
| Phosphoric Acid, wt % | 0.20 | 0.20 | 0.20 |
| OIT (Minutes) | 143 | 144 | 144 |

Examples 10-13

The effect of maleated HDPE concentration on OIT is indicated in the adhesive compositions of Examples 10-13 in which no EPR is used. The detailed compositions and the corresponding OIT values are listed in Table 2.

TABLE 2

| Ex. No. | 10 | 11 | 12 | 13 |
|---|---|---|---|---|
| Maleated HDPE, wt % | 1 | 3 | 5 | 10 |
| LLDPE, wt % | 98.55 | 96.55 | 94.55 | 89.55 |
| Irganox 1010, wt % | 0.1 | 0.1 | 0.1 | 0.1 |
| Irganox 1330, wt % | 0.1 | 0.1 | 0.1 | 0.1 |
| Irgafos 168, wt % | 0.05 | 0.05 | 0.05 | 0.05 |
| Phosphoric Acid, wt % | 0.20 | 0.20 | 0.20 | 0.20 |
| OIT (Minutes) | 155 | 153 | 153 | 163 |

We claim:

1. A polyolefin-based adhesive composition comprising a polyolefin, a maleated polyolefin, a Bronsted acid, and an antioxidant; wherein the Bronsted acid is used in an amount of 0.05 wt % to 0.5 wt %, based on the composition, to improve the oxidative stability of the composition and wherein the polyolefin-based adhesive composition is used as a tie-adhesive layer for multilayer films, pipes, geomembranes, containers, automotive parts, and wire and cable insulations and jackets.

2. The composition of claim 1, wherein the polyolefin is a homopolymer or copolymer of $C_2$ to $C_{10}$ α-olefins.

3. The composition of claim 2, wherein the polyolefin is selected from the group consisting of polyethylene, polypropylene, and mixtures thereof.

4. The composition of claim 3, wherein the polyolefin is a polyethylene.

5. The composition of claim 4, wherein the polyolefin is a linear low density polyethylene.

6. The composition of claim 1, wherein the maleated polyolefin is selected from the group consisting of maleated polyethylene, maleated polypropylene, and mixtures thereof.

7. The composition of claim 1, wherein the maleated polyolefin contains from 1 wt % to 2.5 wt % of grafted maleic anhydride.

8. The composition of claim 1, which comprises from 5 wt % to 35 wt %, based on the composition, of the maleated polyolefin.

9. The composition of claim 1, wherein the Bronsted acid is selected from phosphoric acid, phosphorous acid, and mixtures thereof.

10. The composition of claim 1, which comprises from 0.05 wt % to 0.5 wt %, based on the composition, of the antioxidant.

11. The composition of claim 1, which comprises an elastomer selected from the group consisting of ethylene-propylene rubber, styrene-diene random and block copolymers, and mixtures thereof.

12. The composition of claim 11, which comprises from 5 wt % to 35 wt %, based on the composition, of the elastomer.

13. A multilayer film, pipe, geomembrane, container, automotive part, or a wire and cable insulation or jacket comprising the composition of claim 1.

14. A multilayer film of claim 13, comprising a general structure of
HDPE/tie-layer/EVOH/tie-layer/HDPE, or
LLDPE/HDPE/tie-layer/EVOH/tie-layer/HDPE/LLDPE,
wherein HDPE is a high density polyethylene layer, EVOH is a polyvinyl alcohol layer, and LLDPE is a linear low density polyethylene layer.

* * * * *